(12) United States Patent
Hardin, III et al.

(10) Patent No.: US 9,163,409 B2
(45) Date of Patent: Oct. 20, 2015

(54) THERMAL SHINGLE SEALING APPARATUS

(71) Applicants: John B Hardin, III, Vernon, TX (US); Tim Pool, Seymour, TX (US); John Hardin, Jr., Vernon, TX (US)

(72) Inventors: John B Hardin, III, Vernon, TX (US); Tim Pool, Seymour, TX (US); John Hardin, Jr., Vernon, TX (US)

( * ) Notice: Subject to any disclaimer, the term of this patent is extended or adjusted under 35 U.S.C. 154(b) by 0 days.

(21) Appl. No.: 13/933,950

(22) Filed: Jul. 2, 2013

(65) Prior Publication Data
US 2015/0007945 A1 Jan. 8, 2015

(51) Int. Cl.
*B32B 37/00* (2006.01)
*E04D 15/02* (2006.01)
*B29C 65/10* (2006.01)

(52) U.S. Cl.
CPC .............. *E04D 15/02* (2013.01); *B29C 65/10* (2013.01)

(58) Field of Classification Search
CPC ................ B29C 65/10; B29C 66/9131; B29C 66/91221; B29C 66/9141; E04D 15/02

USPC .......... 156/359, 368, 378, 497, 499, 574, 579
See application file for complete search history.

(56) References Cited

U.S. PATENT DOCUMENTS 3,976,533 A * 8/1976 Strauven ........................ 156/497
6,588,475 B1 * 7/2003 Simon et al. .................. 156/359

* cited by examiner

*Primary Examiner* — James Sells
(74) *Attorney, Agent, or Firm* — Edward L. White

(57) ABSTRACT

A thermal shingle sealing apparatus for use in cool weather installations of thermally-activated shingles, the apparatus comprising a heat source having a fuel source, a burner, an ignition means adapted to light fuel from the fuel source to produce heat, and a controller adapted to regulate the heat produced; a heat disperser including an enclosure defining a cavity therein adapted to disperse heat from the heat source onto shingles; a chassis having a frame, and at least one wheel, whereby, the apparatus is placed on a roof atop the asphalt shingles and heat is applied to the shingles to activate the sealant, thereby bonding the shingles to one another in the cool temperatures providing nearly instant wind protection to the building owner in lieu of waiting for heat activation from the sun sufficiently to activate sealant.

6 Claims, 7 Drawing Sheets

THERMAL SHINGLE SEALING APPARATUS

CROSS-REFERENCE TO RELATED APPLICATIONS

None.

FIELD OF THE INVENTION

The invention relates to a thermal shingle sealing apparatus for applying heat to the thermally activate factory applied sealant on the shingles after their installation in cool weather to facilitate bonding of the layers of shingles. More particularly, the invention relates to an apparatus that may comprise a commercially available heater, a heat directing enclosure and a wheeled chassis, allowing an operator to bond the shingles in cool weather providing more wind protection immediately rather than waiting for sun's heat to activate the sealant.

SUMMARY OF THE INVENTION

The invention relates to a device for heating the factory installed sealant on the shingles, thereby bonding the shingles together in cool weather upon installation, and providing immediate wind protection. More particularly, the invention relates to a device having a heater and a disperser and a wheeled chassis where the heater is positioned adjacent to the disperser and supported by a wheeled chassis, directing heat downward, allowing the operator to push the device along each course of asphalt shingles heating the sealant underneath thereby bonding the shingles together on the roof.

Asphalt roof shingles are the most popular type of roofing material used on residential roofs and have been used successfully in United States in cold climates for over ninety years. Current industry practice requires that the activation temperature of the factory applied sealant be balanced with avoiding premature activation during packaging and storage and activation during and after installation. The consequence of this balance is the activation temperature is a compromise which requires interface temperatures to reach 140-160° F. before bonding of the shingles occurs in an installation. However, the activation temperature requirements for installation present an issue in cool weather and cold climates because there may be insufficient solar heating to bond the shingles properly.

Asphalt shingles are installed in courses, with each upper course overlapping the course below it. To affix the shingles to the roof, the shingles are nailed to the roof and additionally, most asphalt shingles are manufactured with a thermally activated sealant which bonds the shingles together once installed on the roof and exposed to a few weeks of sufficient solar heating to activate the sealant. This sealant works in conjunction with the nails to hold the shingles in place. However, during the winter months, the sun is low on the horizon and the air temperature is too cool for the sun to produce any significant heat to activate the sealant on the shingles, thus preventing the sealant from working properly, and preventing the adhesion of the adjacent shingle courses. As a result, the shingles can easily be lifted up and ripped off the roof when the winds are sufficiently strong.

During cool weather, one method to ensure wind protection until sufficient solar heating occurs is the hard sealing of the asphalt shingles by adding warm roofing tar or cement to the bottom half, back side, of each shingle prior to nailing it in place. This method increases the labor and material costs and imposes new difficulties to the installation. These difficulties include keeping the tar or cement warm during installation, and applying it to every shingle during installation. Additionally, this method for securing the shingles is inefficient because more manpower is required to accomplish the same job in the same allotted time or using the current manpower will require more time to finish the same job both of which are unacceptable in the industry.

U.S. Pat. No. 4,559,267 to Freshwater, teaches a factory applied stick-down system for roofing membranes or shingles employing a sealant compound that exhibits high tackiness at ambient temperatures, which permits sealing to occur at significantly reduced temperatures, while still avoiding premature activation during packaging and storage. The activation temperature was reduced to between 90-130° F. using the new compound. However, this invention did not address significantly cooler temperatures while installing the shingles.

The present invention overcomes these shortcomings in the prior art by providing a simple apparatus for heating and activating the sealant on site during cool weather immediately after shingle installation. The present invention fulfills the industry's need for facilitating cool weather installation by providing a device that can be used to bond the shingles in cool weather giving the home owner immediate wind protection after installation There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the present invention. Additional benefits and advantages of the present invention will become apparent to those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION OF THE INVENTION

Figure 1:
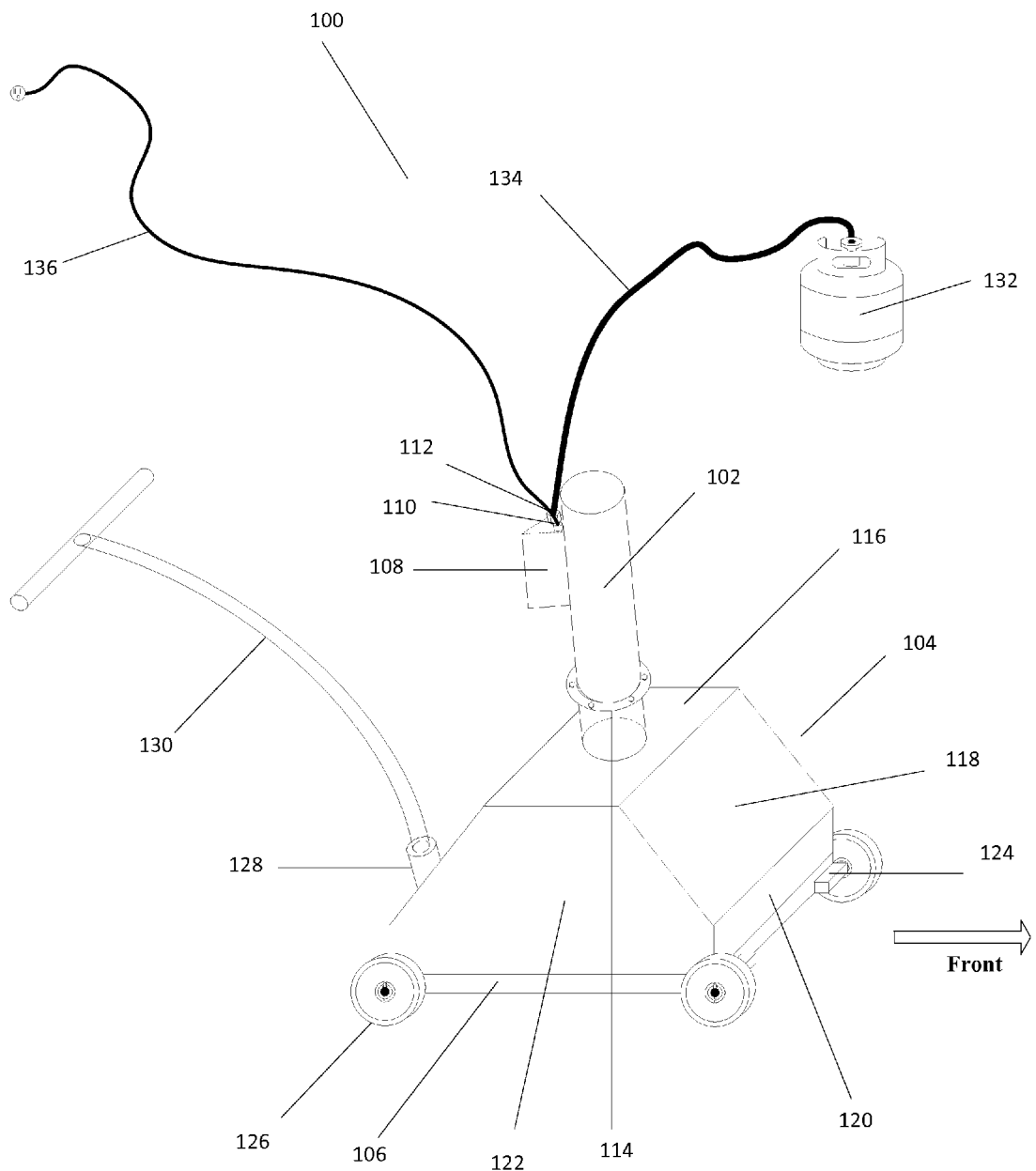
FIG. 1 is a perspective view of the apparatus with a forced air propane heater as a heat source attached to the disperser enclosure and the chassis.

FIG. 1 is a perspective view of the invention, a thermal shingle sealing apparatus 100 highlighting three components: a forced air propane heater 102, a heat disperser 104, and a frame 106. In this embodiment a forced air propane heater 102 sits atop the heat disperser 104 and connects to the top panel 116 by a heater connector 114. The forced air propane heater 102 may have an inside a blower 502, a burner, an ignition system to ignite the propane and finally, a controller 108 to regulate the heat and prevent excessive heat during normal operations reducing the possibility of damaging the roof shingles.

There are at least two methods encompassed within the claims for providing heat. First, the forced air heating method, where a burner heats the air using some type of fossil fuel or an electrical element heats the air and then the air is blown onto the desired shingle area to activate the sealant on the opposing side of the shingle with sufficient heat to bond the shingles. Second, the radiant heating method is another technique where the heating element using fossil fuel or electricity is positioned directly above the desired shingle area and in close proximity to the shingles to heat and bond the shingles. With either of these methods, the heat capacity of the heating source must be sufficient to transfer heat through a shingle to the opposing side with sufficient ability to activate the sealant.

Propane may be replaced with other types of fossil fuels such as kerosene, natural gas, and diesel, depending the availability to the operator in their local area. Additionally, a radiant heater can replace the current forced air propane heater 102 used in the present invention to provide the heat source. Finally, the fossil fuel heat source may be replaced by removing the burner and ignition system and replacing them with heating elements where electricity provides the source of heat for the thermal shingle sealing apparatus 100.

FIG. 1 further depicts the controller 108 mounted to the side of the forced air propane heater 102 with a temperature control knob 200 depicted later in FIG. 2, and two connections, a power input 110 and a fuel input 112. The first connection, the power input 110 preferably provides common household 120 volt electrical power to the thermal shingle sealing apparatus 100 by an electric power cord 136. This power is supplied to the blower 502, which provides the forced air and to the controller 108. The second connection on the controller 108 is a connection for a fuel input 112 where the fuel is supplied to the thermal shingle sealing apparatus 100 through a fuel hose 134.

As primarily described, propane is the fuel source utilized and is supplied by a propane tank 132. Once the propane tank 132 is connected to the fuel input 112 and the power cord 136 is connected to common household power, the apparatus is ready to be utilized. To improve operability and safety, the power supplied to the power input 110 may be replaced by a battery and a power inverter with sufficient power to operate the blower 502 during normal sealing operation. Additionally, solar panels may be used to replenish energy to the battery during normal operations.

The heat disperser 104 is also shown in FIG. 1. The forced air propane heater 102 is attached to the top panel 116 of the heat disperser 104 by a heater connector 114. The heat disperser 104 consists of a top panel 116, a front angle panel 118, a front lower panel 120, left and right side panels 122, rear angle panel 306, and a rear lower panel 308. The rear angle panel 306 and rear lower panel 308 are depicted later in FIG. 3 in more detail. The front angle panel 118 and the rear angle panel 306 assist in deflecting the heat downward toward shingles. The panels of the current invention are fabricated from aluminum but one skilled in the art may use other materials to create the panels. These panels are preferably welded together at the seams to provide structural rigidity and support for the forced air propane heater 102 and to prevent heat loss. Welding is but one method to connect the panels together. One skilled in the art may choose other methods that are just as effective in providing structural rigidity to the disperser and prevent heat loss. These panels come together to create an enclosure by which air from the forced air propane heater 102 is directed down on to the shingles and the heat from the forced air propane heater 102 is contained within the heat disperser 104 thereby raising the temperature in the local area over the shingles covered by the heat disperser 104 in order to activate the sealant to bond the shingles together and provide wind protection for a newly installed roof in cool temperatures.

The chassis, as depicted in FIG. 1, preferably consists of a frame 106, four wheels 126, and a handle 130. The chassis is positioned to support the heat disperser 104 and the forced air propane heater 102. The frame 106 preferably fits the perimeter of the heat disperser 104, and it must be sufficiently strong to support the weight of the heat disperser 104 and the forced air propane heater 102. Additionally, the chassis may be designed with sufficient strength to support mounting a propane tank 132 on the chassis.

At each corner of the chassis 106 is mounted a wheel 126 to allow the thermal shingle sealing apparatus 100 to be moved by a handle 130 during normal operations. The wheels 126 are affixed to the frame 106 by axle chassis connectors 124 where an axle 202 protrudes from the axle chassis connectors 124 through the wheels 126 to provide mobility and maneuverability. The wheel 126 assembly is further described in FIG. 2. A handle 130 is connected to the frame 106 by a handle collar 128. The handle collar 128 preferably allows for easy removal of the handle 130 for placement onto the roof before beginning operations. The handle 130 mounting is further described in FIG. 3. It may be desirable to provide a handle that can be adjusted to a height comfortable for the particular operator.

Figure 2:
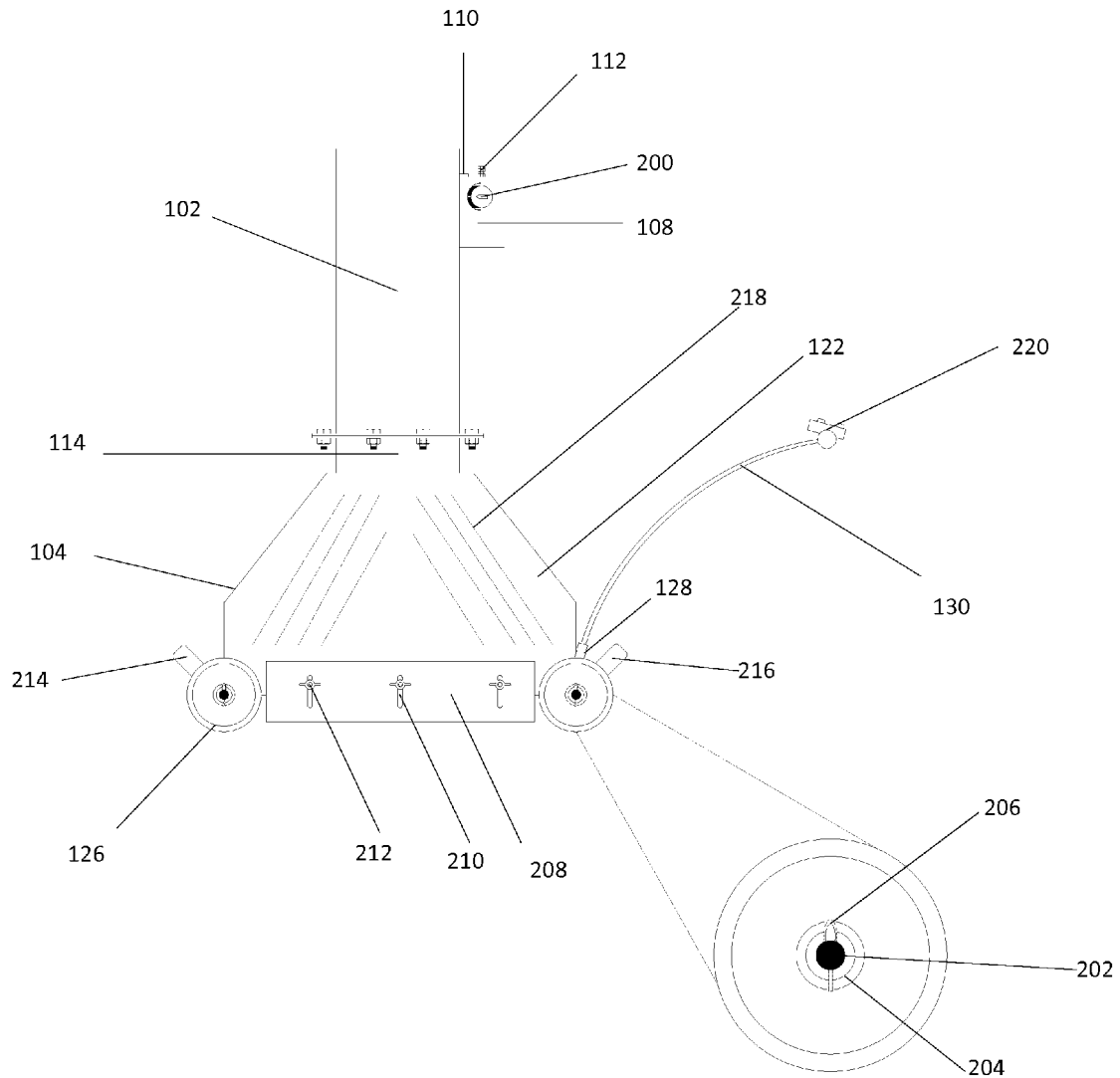
FIG. 2 is a side view of the left side of the apparatus with an exploded view of the wheel.

FIG. 2 illustrates the left side of the thermal shingle sealing apparatus 100 with an exploded view of the wheel 126. In this view, several features are illustrated, a temperature control knob 200, skirts 208, and wheels 126. As illustrated above, the controller 108 affixed to the forced air propane heater 102 includes a temperature control knob 200 attached to the side of the controller 108. The temperature control knob 200 allows the operator to choose a desired setting, which determines the amount of heat generated by the forced air propane heater 102. This temperature control knob 200 comes standard with a commercially available forced air propane heater. An alternative to controlling the forced air propane heater 102 by the controller 108 is affixing a system control and display unit 220 on the handle 130 where the operator can control the temperature of the forced air propane heater 102 during operations. The details of the system control and display unit 220 are further described in FIG. 4.

In order to provide consistent heating over the total area underneath the heat disperser 104, heat directors 218 inside the cavity 500 are used to divert a portion of the air flow away from the central point directly underneath the forced air propane heater 102. There are preferably multiple heat directors 218 affixed to the two side panels 122 that distribute the heat more evenly throughout the heat disperser 104 thereby providing more uniform heating under the heat disperser 104 in order to more efficiently activate the sealant and bond the shingles together.

Figure 4:
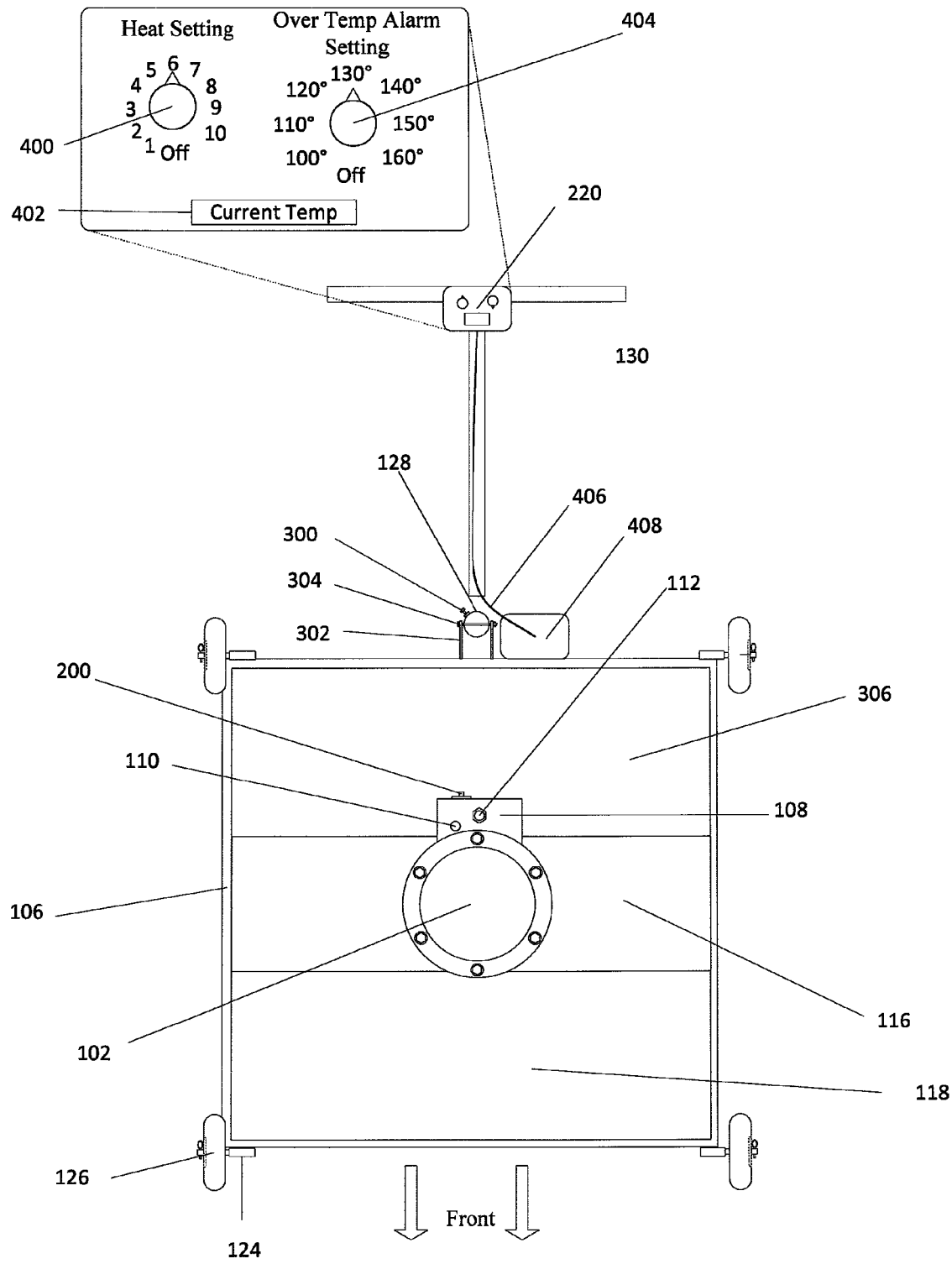
FIG. 4 is a top view of the apparatus illustrating the controls.

FIG. 2 depicts the present invention with two wheels 126 on the left side of the thermal shingle sealing apparatus 100. On the right side further illustrated later in FIG. 4, is a set of companion wheels 126. Each wheel 126 is attached to the frame 106 by an axle chassis connector 124. This axle chassis connector 124 is connected to the front and rear of the frame 106 where an axle 202 protrudes through the wheel 126 allowing it to be positioned on the axle 202.

The exploded view of FIG. 2 depicts the positioning of the wheel 126 onto the axle 202, a wheel retaining washer 204 installed on the axle 202 and a wheel retaining pin 206 inserted in a hole through the axle 202 thus preventing the wheel 126 from departing during operations. The wheel retaining washer 204 is positioned between the wheel 126 and the wheel retaining pin 206 to prevent the wheel retaining pin 206 from interfering with the wheels 126 during normal operations. The wheel retaining pin 206 is known in the industry as a "cotter pin" which prevents the wheel 126 from departing the axle 202. Other methods to prevent wheel 126 departure are well known to one skilled in the art and may be used to secure the wheel 126.

The axle chassis connector 124 is rigidly affixed to the frame 106 by welding the axle chassis connector 124 to the frame 106 but one skilled in the art can choose other known methods for affixing the axle chassis connector 124 to the frame 106. Additionally, the operator may want to lower or raise the frame 106 with respect to the shingle surface allowing the operator to position the heat closer to the surface of the shingles based on the outdoor weather conditions. This may be accomplished using other methods for affixing the wheel 126s to the frame 106 instead of welding the axle chassis connector 124 directly to the frame 106, such as installing standard push lawn mower height type adjustments. The height adjustment is accomplished by adjusting the front height adjustments 214 on both the front left and right side and the rear height adjustments 216 on the rear left and right side. The ability to raise and lower the thermal shingle sealing apparatus 100 allows the operator to control the loss of heat based on the wind and temperature conditions. This is one method to reduce the amount of heat loss. In addition to height adjustments, another method to reduce heat loss is to add skirts 208.

FIG. 2 illustrates the preferred availability of a skirt 208 adjustably attached to the frame 106. The skirt 208 has multiple adjustment slots 210 allowing the skirt 208 to be adjusted vertically enabling an operator to control the air flow under the frame 106 thereby retaining and maintaining the heat within the cavity 500 to provide uniform heating atop the shingles. Connectors protruding from the frame 106 extend through the skirt 208 at the adjustment slots 210 where wing nuts 212 are used to secure the skirts 208 in the desired position of the operator. Other methods may be used to attach the skirts 208 to the frame 106 in order to make readily adjustable. These skirts 208 prevent excessive air flow blowing under the frame 106 and removing heat from desired area with the result of the apparatus taking either longer to heat and bond the shingles or requiring more heat from the forced air propane heater 102 for bonding to occur.

Figure 3:
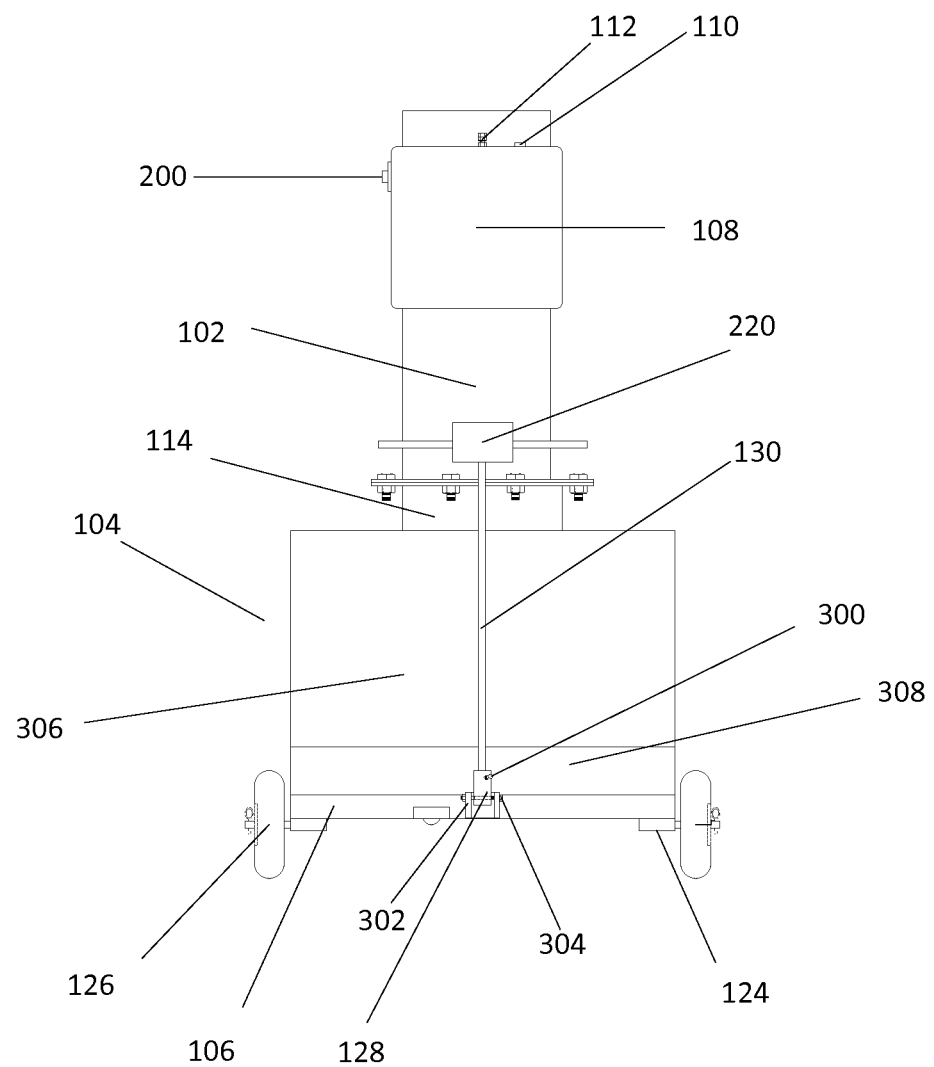
FIG. 3 is a rear view of the apparatus.

FIG. 3 illustrates the handle 130 and its connection to the thermal shingle sealing apparatus 100. The handle 130 is in a T-bar configuration whereupon the upper part of the T provides the operator controls for directing the movement of the apparatus over the shingles to help bond them. Also located at the intersection of the horizontal part of the T-bar intersection is a system control and displaying unit 220 for quick and easy access during normal operations.

The handle 130 is connected to the frame 106 by a handle collar 128. The outer diameter of the handle 130 is less than the handle collar's 128 inner diameter and the handle 130 slips inside the handle collar 128 where it is secured in place by the friction of the handle retaining bolt 300. This handle retaining bolt 300 prevents the handle 130 from coming out of the handle collar 128 and also prevents the handle 130 from rotating inside the handle collar 128. Other methods of affixing a handle including, but not limited to, other methods of securing the handle 130 inside the handle collar 128 will be apparent to one skilled in the art.

A handle mount 302 then mounts the handle collar 128 to the frame 106. The handle 130 and the handle collar 128 pivot around a handle collar mounting bolt 304 which extends horizontally through the handle mount 302 and through the handle collar 128 protruding through the other side of the handle collar 128 and the handle mount 302 and is secured in place by a standard fastener. This handle collar mounting bolt 304 allows the handle collar 128 to pivot up and down freely about the handle collar mounting bolt 304 enabling different operators of varying heights to control the thermal shingle sealing apparatus 100.

FIG. 4 depicts all four wheels 126 attached to the frame 106 as viewed from above as was previously mentioned. FIG. 4 also shows the rear angle panel 306 that was previously mentioned but not depicted. The rear angle panel 306 is a companion panel to the front angle panel 118. These panels work in concert to help project down and deflect the heated air from the forced air propane heater 102.

FIG. 4 further describes the system control and display unit 220, which has three central parts. First, it has a heat setting 400 where the heat settings are predetermined settings where a number corresponds to a specific heat output from the forced air propane heater 102. Next, it has an over-temperature alarm 404 where the operator can set the alarm to notify operator when the shingle's temperature exceeds a maximum temperature to prevent damage to the shingles when the system is in use. The settings for the over-temperature alarm 404 could be set at the factory or by the operator on site providing more flexibility in the field. Finally, it has a temperature display 402, which measures the temperature of the shingles on the trailing edge using a temperature sensor 504 mounted to a sensor mount 408 at the rear of the frame 106 next to the handle collar 128. The system control and display unit 220 receives its information from heat sensor 504 via a sensor cable 406. Alternately, the sensor cable 406 could be replaced with a transmitter/receiver system with the temperature sensor 504 sending signals to the system control and display unit 220.

Figure 5:
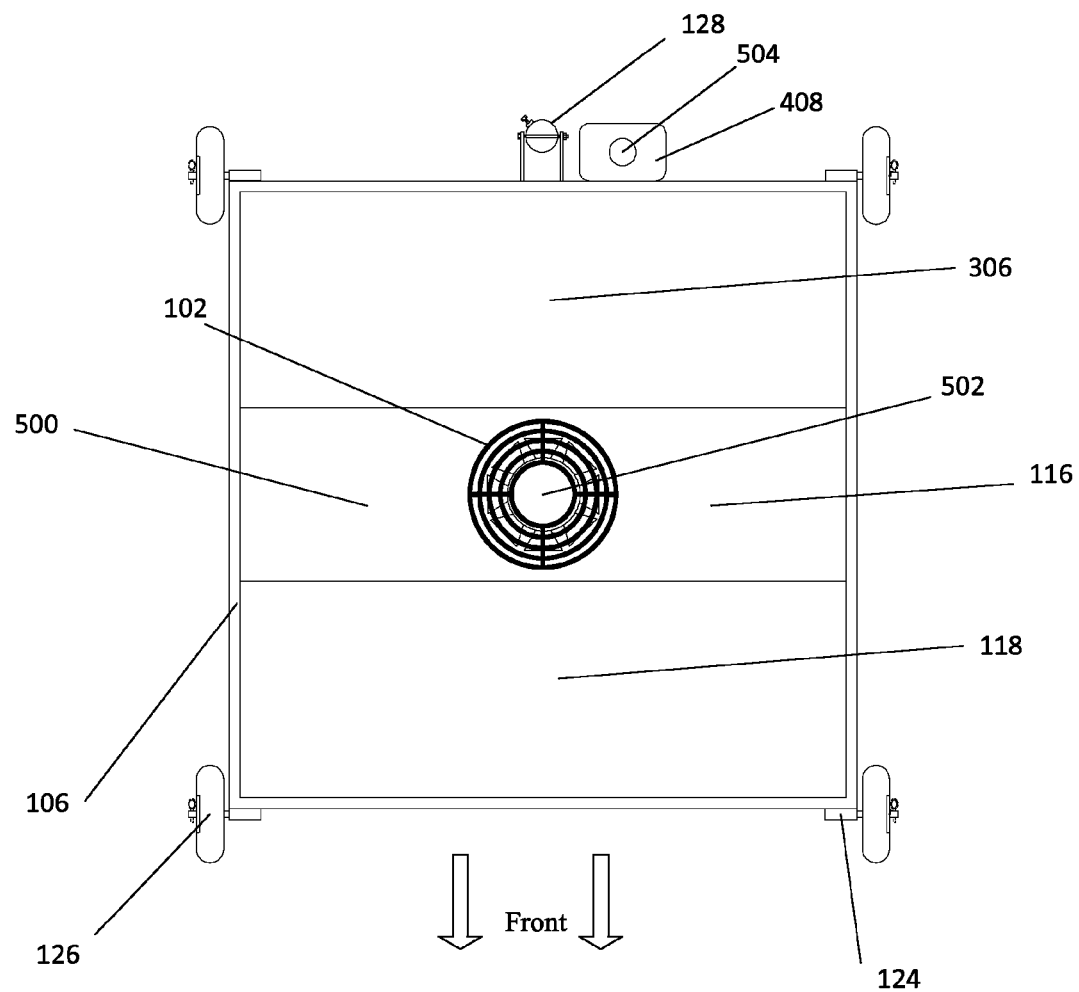
FIG. 5 is an underside view of the apparatus illustrating the cavity defined by the enclosure.

FIG. 5 is a bottom view of the thermal shingle sealing apparatus 100, which illustrates the cavity 500 that is created by the heat disperser 104 as defined earlier in FIG. 1. Additionally, this figure shows the blower 502 of the forced air propane heater 102, where the blower 502 has a protective grill and a fan for producing the proper air flow to push the heat down onto the surface of the shingles. Also shown in this figure is a heat temperature sensor 504, which is connected to the sensor mount 408 and the sensor cable 406. This temperature sensor 504 is typically an infrared sensor, which measures the heat radiating from the shingles after the heat from the apparatus has been applied. The information obtained from the temperature sensor 504 determines when the alarm should be activated thereby alerting the operator to reduce the amount of heat being applied.

Figure 6:
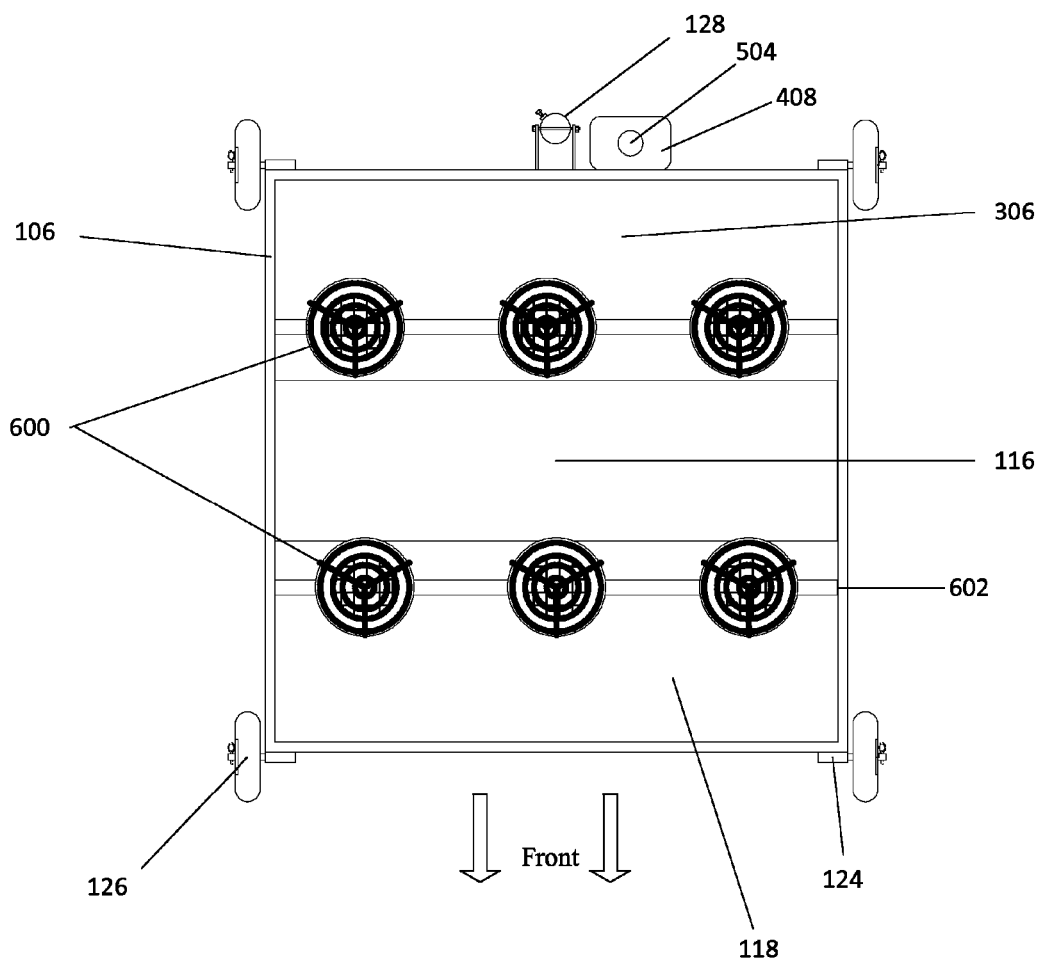
FIG. 6 is an underside view of the apparatus with radiant heaters replacing the forced air propane heater as a heat source.

FIG. 6 is a bottom view of the thermal shingle sealing apparatus 100 with radiant heaters 600. The radiant heaters 600 are suspended from the radiant heater supports 602, which attach to both side panels 122. Alternately, the radiant heaters 600 may be supported longitudinally by the radiant heater supports 602, which would be connected to the front and back of the thermal shingle sealing apparatus 100. The attachment points should allow the radiant heater supports 602 to be moved, enabling the radiant heaters 600 to be placed closer to the shingles to facilitate bonding or further away from the shingles to prevent damage.

Figure 7:
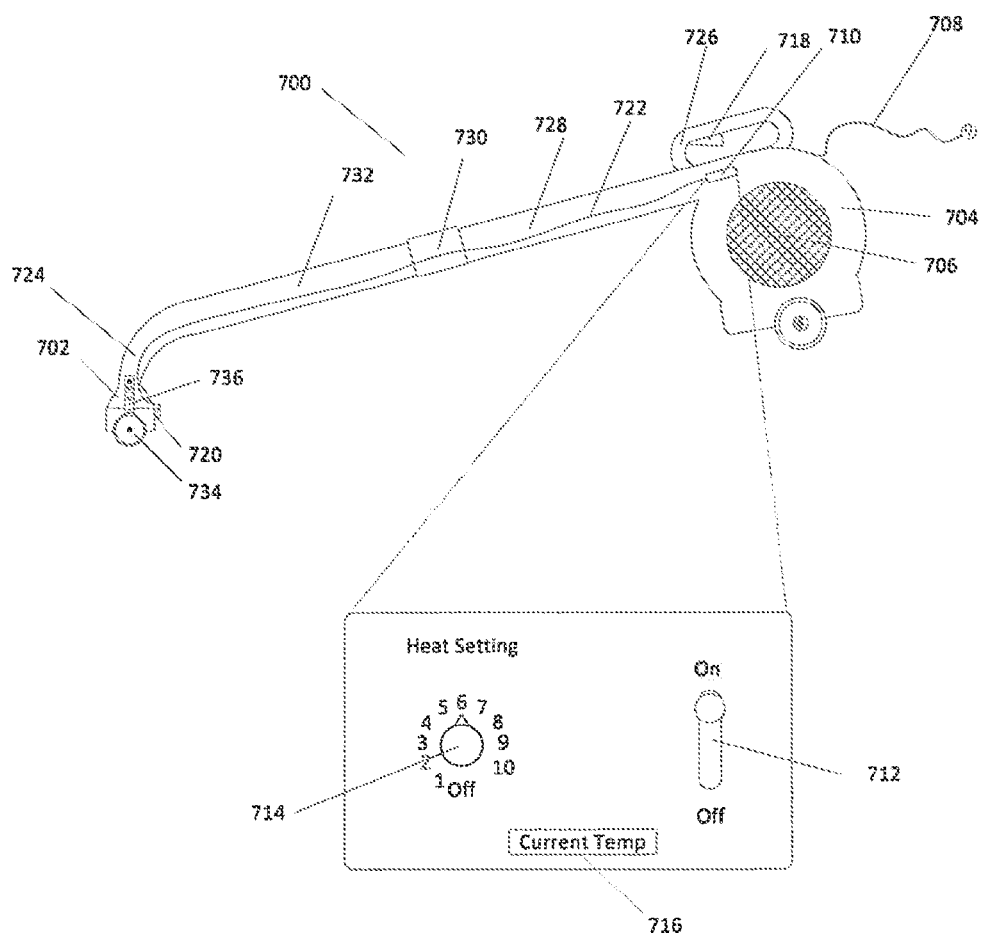
FIG. 7 is a side view of the left side of a second embodiment the apparatus.

FIG. 7 illustrates another embodiment of the present invention. While this embodiment could be used on any pitch of roof, it is specifically adapted for use on high-pitched roofs where the embodiment previously discussed herein was designed for lower pitched roofs because use of the previous embodiment would present safety concerns and would not produce the results of heating the sealant and bonding the shingles that is desired. The embodiment shown in FIG. 7, like the previously-described embodiment, has three components upon which the discussion herein will focus: a forced air electric heater 700, a disperser 702 and a chassis 704.

The forced air electric heater 700 utilizes a blower 706 to force air through an upper blower tube 728 and a lower blower tube 732 into the forced air input 724 wherein the air is heated by heating elements 800 inside the disperser 702. The air is moved across the heating elements 800 raising the temperature of the air in the disperser cavity 802 and the outgoing air to the desired temperature in order activate the sealant and bond the shingles. The blower 706 is powered by common household electricity through the use of a power cord 708. The electricity supplied is used to control the airspeed from the blower 706 through an airflow control trigger 718, which allows an operator to determine the amount of air being forced across the heating elements 800 and onto the shingles by the airflow control trigger 718 positions.

Additionally, the heat from the heating elements 800 is controlled by a controller 710 attached to the chassis 704. The controller 710 has two operator controls and a display. The first operator control is the power switch 712, the second operator control is the heat setting knob 714, which may be set at various levels depending on the outdoor conditions under which the shingles are being installed and lastly is the temperature display 716 that displays a temperature from the temperature sensor 720. The temperature sensor 720 is positioned on the trailing edge of the disperser 702 in order to determine whether the heat being applied to the shingles is at an acceptable level to activate the sealant and bond the shingles, too low to activate the sealant or in excess which could damage the shingles. This temperature sensor 720 is typically an infrared sensor, which measures the heat radiating from the shingles after the heat from the apparatus has been applied. A signal is sent from the temperature sensor 720 through a control cable 722 to the temperature display 716 on the controller 710.

FIG. 7 further depicts the heat disperser 702 having a forced air input 724 and two wheels 734 that adjust to maintain the height of the disperser 702 above the shingles by wheel height adjustments 736.

The chassis 704 in this embodiment comprises the body surrounding the blower 706 described as the chassis 704, which includes a handle 726, an upper blower tube 728, a length adjustment sleeve 730, and the lower blower tube 732. These elements comprise a chassis 704 by which wheels 734 attach to the chassis 704 and the disperser 702 enabling the apparatus to be transported by a operator utilizing the handle 726, positioned on the roof and moved up and down the roof sealing the shingles. This embodiment specifically addresses issues with high-pitched roofs that would not allow the first embodiment to be used due to safety concerns. An operator standing on a ladder as the shingles are being installed can move the apparatus to cover and activate the sealant of the newly installed shingles. Additionally, the wheels 734 attached to the disperser 702 may be adjusted to place the disperser 702 closer to or further from the shingles thereby preventing damage while bonding the shingles together.

Figure 8:
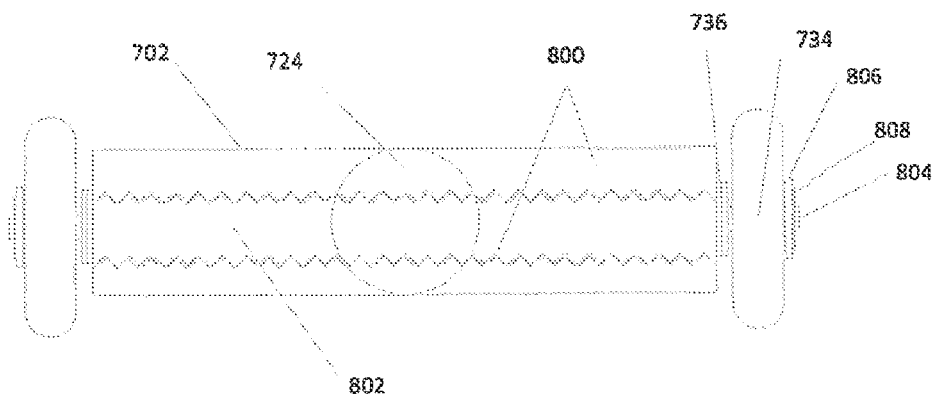
FIG. 8 is an underside view of the second embodiment of the apparatus.

FIG. 8 depicts the underside of the heat disperser 702, an enclosure that creates a disperser cavity 802 where heat is produced by heating elements 800 affixed inside the heat disperser 702 and is spread over a focused area by the forced air from the blower 706 through the upper blower tube 728 and lower blower tube 732 to the forced air input 724. The number of heating elements 800, required is based on the amount of heat that is needed to be able to activate the sealant on the shingles.

FIG. 8 further depicts the wheel 734 and its component parts, an axle 804, a wheel retaining washer 806, and a wheel retaining pin 808. The axle 804 protrudes through the wheel 734 and the wheel retaining washer 806 and the wheel retaining pin 808 is placed in a hole in the axle 804 securing the wheel 734.

These two embodiments enable an operator to heat the sealant and allow the shingles to be bonded on a wide range of roofs varying in pitch as demonstrated by the first embodiment with the four-wheeled chassis apparatus for low-pitched roofs and the second embodiment with the handheld wheeled apparatus for high-pitched roofs, both of which are described above. Additionally these embodiments may be used during installation of the singled roof and after the shingling is complete. The apparatus is not required for shingle installation The purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

While the invention has been shown, illustrated, described, and disclosed in terms of specific embodiments or modifications, the scope of the invention should not be deemed to be limited by the precise embodiments or modifications therein shown, illustrated, described, or disclosed. Such other embodiments or modifications are intended to be reserved especially as they fall within the scope of the claims herein appended.

Having thus described the invention, we claim:

1. A thermal shingle sealing apparatus for use in cool weather installations of thermally-activated shingles, the apparatus comprising:

a. a heat source adapted to transfer heat through the shingle from an upper side to activate a sealant on an opposing side;
b. a heat source connector adapted to connect a heat source to a heat disperser that is angularly-adjustable to maintain the heat source in a desired alignment adapted to the pitch of the roof;
c. a heat disperser including an enclosure defining a cavity therein adapted to disperse heat from the heat source onto shingles; and
d. a chassis having—
   i. a frame, and
   ii. at least one wheel,
whereby the apparatus is placed on a roof atop asphalt shingles, the heat source is adjusted to a desired position and heat is applied to the shingles to activate the sealant on the shingles, thereby bonding the shingles to one another in the cool temperatures providing nearly instant wind protection to the building owner in lieu of waiting for heat activation from the sun once temperatures of the shingles warm sufficiently to activate the sealant.

2. The apparatus of claim 1, where the heat disperser further comprises at least one adjustable height skirt affixed to at least one side whereby an operator can set each skirt at a desired height from the shingles.

3. The apparatus of claim 1, where the chassis comprises at least one adjustable height wheel adapted to raise and lower the chassis to accommodate a range of roof pitches.

4. A thermal shingle sealing apparatus for use in cool weather installations of thermally-activated shingles, the apparatus comprising:
a. a forced air heater;
b. an adjustable heat source connector;
c. a heat disperser having—
   i. a panel adapted to attach to the propane heater, and
   ii. a cavity defined underneath adjacent to the propane heater adapted to direct the heat toward the work surface and maintain the heat within the cavity at a desired level for operation;
d. a chassis
   i. a frame,
   ii. at least one wheel, and
   iii. at least one handle adapted to move the apparatus over selected shingles,
whereby the apparatus is placed on a roof atop asphalt shingles, the heat source is adjusted to a desired position, and heat is applied to the shingles to activate the sealant on the shingles, thereby bonding the shingles to one another in the cool temperatures providing nearly instant wind protection to the building owner in lieu of waiting for heat activation from the sun once temperatures of the shingles warm sufficiently to activate the sealant.

5. The apparatus of claim 4, where the heat disperser further comprises at least one adjustable height skirt affixed to at least one side whereby an operator can set each skirt at a desired height from the shingles.

6. The apparatus of claim 4, where the chassis comprises at least one adjustable height wheel adapted to raise and lower the chassis to accommodate a range of roof pitches.

* * * * *